(12) United States Patent
Hasegawa et al.

(10) Patent No.: US 11,849,348 B2
(45) Date of Patent: Dec. 19, 2023

(54) COMMUNICATION SYSTEM, TERMINAL, CONTROL METHOD, AND NONTRANSITORY COMPUTER-READABLE MEDIUM STORING PROGRAM

(71) Applicant: NEC Corporation, Tokyo (JP)

(72) Inventors: Yohei Hasegawa, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 17/616,231

(22) PCT Filed: Feb. 5, 2020

(86) PCT No.: PCT/JP2020/004430
§ 371 (c)(1),
(2) Date: Dec. 3, 2021

(87) PCT Pub. No.: WO2020/246069
PCT Pub. Date: Dec. 10, 2020

(65) Prior Publication Data
US 2022/0256398 A1 Aug. 11, 2022

(30) Foreign Application Priority Data
Jun. 7, 2020 (JP) .................................. 2019-107112

(51) Int. Cl.
*H04W 28/04* (2009.01)
*H04L 1/00* (2006.01)
*H04L 1/20* (2006.01)

(52) U.S. Cl.
CPC ........... *H04W 28/04* (2013.01); *H04L 1/0003* (2013.01); *H04L 1/203* (2013.01)

(58) Field of Classification Search
CPC .......................... H04W 28/04; H04W 28/0236; H04L 1/0003; H04L 1/203; H04L 1/0002; H04L 2001/0092; H04L 47/25
(Continued)

(56) References Cited

U.S. PATENT DOCUMENTS 6,618,591 B1 9/2003 Kalliokulju et al.
9,077,486 B1 * 7/2015 Yuan ..................... H04L 47/263
(Continued)

FOREIGN PATENT DOCUMENTS

EP 2058983 A1 5/2009
JP 2001-160824 A 6/2001
(Continued)

OTHER PUBLICATIONS

International Search Report for PCT Application No. PCT/JJP2020/004430, dated Mar. 31, 2020.
(Continued)

*Primary Examiner* — Rownak Islam
(74) *Attorney, Agent, or Firm* — Sughrue Mion, PLLC

(57) ABSTRACT

A communication system includes: a transmitting-side terminal; a transmitting-side communication apparatus configured to receive data transmitted by the transmitting-side terminal and transmit the received data by radio transmission to a receiving-side communication apparatus; and the receiving-side communication apparatus configured to transmit the data received by radio transmission from the transmitting-side communication apparatus to a receiving-side terminal. The transmitting-side terminal includes a control unit configured to control a transmission speed of the data addressed to the receiving-side terminal based on a first error rate that is an error rate of radio transmission from the transmitting-side communication apparatus to the receiving-side communication apparatus and a second error rate that is
(Continued)

an error rate of transmission from the transmitting-side terminal to the receiving-side terminal.

9 Claims, 8 Drawing Sheets

(58) Field of Classification Search
    USPC .......................................................... 370/230
    See application file for complete search history.

(56) References Cited

U.S. PATENT DOCUMENTS

| | | | |
|---|---|---|---|
| 2007/0223390 A1 | 9/2007 | Kobayashi et al. | |
| 2010/0067533 A1 | 3/2010 | Yoshida et al. | |
| 2012/0033578 A1* | 2/2012 | Anderson | H04W 52/20 |
| | | | 370/252 |
| 2012/0063493 A1 | 3/2012 | Hasegawa et al. | |
| 2014/0029408 A1* | 1/2014 | Yamamoto | H04L 1/0009 |
| | | | 370/216 |

FOREIGN PATENT DOCUMENTS

| | | |
|---|---|---|
| JP | 2008-061267 A | 3/2008 |
| JP | 2012-049677 A | 3/2012 |
| WO | 01/031832 A1 | 5/2001 |
| WO | 2010/100837 A1 | 9/2010 |

OTHER PUBLICATIONS

Terada Takehiro et al., "A Study on Various TCPs Transmission Performance on WINDS Regenerative Communication Link", IEICE Technical Report, vol. 111, No. 179. Aug. 18, 2011, pp. 123-128.
Hasegawa Yohei et al., "Development of TCP/IP Data Transfer Throughput Enhancement System", IEICE Transactions on Information and System B, vol. J101-B, No. 10, Oct. 1, 2018, pp. 841-856.
Mark Allman et al., "Ongoing TCP Research Related to Satellites", IETF RFC 2760, Oct. 1999, pp. 1-39.
Extended European Search Report for EP Application No. 20817717. 0, dated Jun. 30, 2022.
Zhang Q et al: "Channel-Adaptive Resource Allocation for Scalable Video Transmission Over 3G Wireless Network", IEEE Transactions on Circuits and Systems for Video Chnology, vol. 14, No. 8, Aug. 1, 2004, pp. 1049-1063.
Qingwen Liu et al: "TCP Performance in wireless access with adaptive modulation and coding", 2004 IEEE International Conference on Communications; ICC 2004; vol. Jun. 7, 20, 2004, pp. 3989-3993.

* cited by examiner

COMMUNICATION SYSTEM, TERMINAL, CONTROL METHOD, AND NONTRANSITORY COMPUTER-READABLE MEDIUM STORING PROGRAM

This application is a National Stage Entry of PCT/JP2020/004430 filed on Feb. 5, 2020, which claims priority from Japanese Patent Application 2019-107112 filed on Jun. 7, 2019, the contents of all of which are incorporated herein by reference, in their entirety.

TECHNICAL FIELD

The present disclosure relates to a communication system, terminal, a control method, and a program.

BACKGROUND ART

As the speed of communication is getting faster, utilization of high frequency signals is increasing. Utilization of millimeter waves in the 5G (5th Generation) mobile system and satellite communication is becoming greater in the field of radio communication, and in the future, even greater utilization of a terahertz band and optical wavelength band is expected.

However, it is known that since energy for transferring one bit is small in a high-frequency band, radio signals are easily shielded, whereby a bit error rate worsens. When signal attenuation is large, in order to obtain a signal intensity of a desired level on the receiving side, more signal amplification is required, and the amplification noise thereof increases accordingly. According to the Friis transmission equation, signal attenuation increases in proportion to the square of the frequency. Therefore, when a high frequency is used in order to perform high-speed communication, the bit error rate increases simultaneously.

Incidentally, in recent radio communication systems, an adaptive modulation scheme and the like based on the reception signal intensity and the bit error rate has been introduced. In this case, for instance, adaptive modulation is carried out in order to provide communication with a sufficiently low bit error rate to the client, and as a result thereof, throughput may be extremely small. It is considered that when utilization of a higher frequency in the radio communication is further developed in the future, it will become more difficult to maintain the level of the bit error rate at the present-day standard while increasing the throughput.

Further, in the adaptive modulation scheme, the throughput to be provided to the user varies. When the adaptive modulation scheme is applied to high frequency communication that is susceptible to shielding and the like, in order to provide communication with a low bit error rate, it is necessary to change control more than in the case in which a high frequency is not used. Therefore, it is conceivable that a change in the throughput may become larger than that in the case in which a high frequency is not used.

In a mobile network or the like in which the throughput changes greatly in accordance with the adaptive modulation, it is presupposed that a link-level retransmission function such as ARQ (automatic repeat request) is used. Therefore, it is a general practice to provide, to a terminal, communication services in which communications are performed as if there are no packet losses. However, in a high-speed communication, many memory resources are necessary in order to implement the ARQ, which leads to a problem that the cost for implementation of the ARQ becomes high. Further, in a long-distance communication, there is a case in which the delay due to the ARQ that is added to the communication becomes unacceptably large for the processing of the terminal performed based on the TCP (Transmission Control Protocol). As described above, the environment in which the ARQ can be used is limited.

Regarding the terminal, when the bit error rate is high, serious degradation in the data transfer performance among the terminals is anticipated. In the transport protocol (TCP) which it is assumed is used in a general network, only an extremely low data transfer rate is obtained in communication among the terminals performed through a communication channel in which the bit error rate is high. There is another TCP which it is assumed is used in a radio communication channel in which there is a bit error. However, a case that can be handled by the aforementioned TCP is one in which the bit rate error rate is low, e.g. $10^{-5}$, while it is known that in a case in which the bit error is high, e.g. exceeding $10^{-3}$, the data transfer throughput decreases significantly.

According to the TCP, it is a general practice to detect congestions that occur within the network from the occurrence of packet losses and increase in the delay. However, supposing a case in which not all bit errors can be recovered even in accordance with the adaptive modulation and further, the delay fluctuates in accordance with the adaptive modulation or the ARQ, it is considered that a search based on the TCP for a suitable line speed is extremely difficult. Further, in a case where a large number of terminals share a line, it becomes even more difficult to search for a suitable line speed.

Further, as a related technique, a technique disclosed in Patent Literature 1 is known. In Patent Literature 1, it is disclosed that in performing radio communication between the communication apparatuses, when a packet error rate is greater than a predetermined threshold value, control for lowering the data rate is performed.

CITATION LIST

Patent Literature

Patent Literature 1: Japanese Unexamined Patent Application Publication No. 2012-049677

SUMMARY OF INVENTION

Technical Problem

As described above, Patent Literature 1 discloses that based on the packet error rate in the radio communication performed between the communication apparatuses, the data rate of the radio communication between the communication apparatuses is controlled. However, in Patent Literature 1, congestions that occur in transmitting data from a terminal that utilizes radio communication performed by a communication apparatus to the communication apparatus are not taken into account.

Therefore, an object of the present disclosure is to provide a communication system, a terminal, a control method, and a program, each adapted to suitably set the transmission speed at which the terminal transmits data to the communication apparatus that performs radio communication while suppressing congestions.

Solution to Problem

A first example aspect of the present disclosure is a communication system including:

a transmitting-side terminal;

a transmitting-side communication apparatus configured to receive data transmitted by the transmitting-side terminal and transmit the received data by radio transmission to a receiving-side communication apparatus; and the receiving-side communication apparatus configured to transmit the data received by radio transmission from the transmitting-side communication apparatus to a receiving-side terminal, the transmitting-side terminal including control means for controlling a transmission speed of the data addressed to the receiving-side terminal based on a first error rate that is an error rate of radio transmission from the transmitting-side communication apparatus to the receiving-side communication apparatus and a second error rate that is an error rate of transmission from the transmitting-side terminal to the receiving-side terminal.

A second example aspect of the present disclosure is a terminal configured to transmit, to a transmitting-side communication apparatus configured to perform radio communication with a receiving-side communication apparatus configured to perform communication with a receiving-side terminal, data addressed to the receiving-side terminal, the terminal comprising control means for controlling a transmission speed of the data addressed to the receiving-side terminal based on a first error rate that is an error rate of radio transmission from the transmitting-side communication apparatus to the receiving-side communication apparatus and a second error rate that is an error rate of transmission from the terminal to the receiving-side terminal.

A third example aspect of the present disclosure is a method of controlling a terminal configured to transmit, to a transmitting-side communication apparatus configured to perform radio communication with a receiving-side communication apparatus configured to perform communication with a receiving-side terminal, data addressed to the receiving-side terminal, the method including:

acquiring a first error rate that is an error rate of radio transmission from the transmitting-side communication apparatus to the receiving-side communication apparatus and a second error rate that is an error rate of transmission from the terminal to the receiving-side terminal; and controlling a transmission speed of the data addressed to the receiving-side terminal based on the first error rate and the second error rate.

A fourth example aspect of the present disclosure is a program for causing a computer of a terminal configured to transmit, to a transmitting-side communication apparatus configured to perform radio communication with a receiving-side communication apparatus configured to perform communication with a receiving-side terminal, data addressed to the receiving-side terminal to perform a control step of controlling a transmission speed of the data addressed to the receiving-side terminal based on a first error rate that is an error rate of radio transmission from the transmitting-side communication apparatus to the receiving-side communication apparatus and a second error rate that is an error rate of transmission from the terminal to the receiving-side terminal.

Advantageous Effects of Invention

According to the aforementioned aspects, it is possible to provide a communication system, a terminal, a control method, and a program, each adapted to suitably set the transmission speed at which a terminal transmits data to a communication apparatus configured to perform radio communication while suppressing congestions.

DESCRIPTION OF EXAMPLE EMBODIMENT

Figure 1:
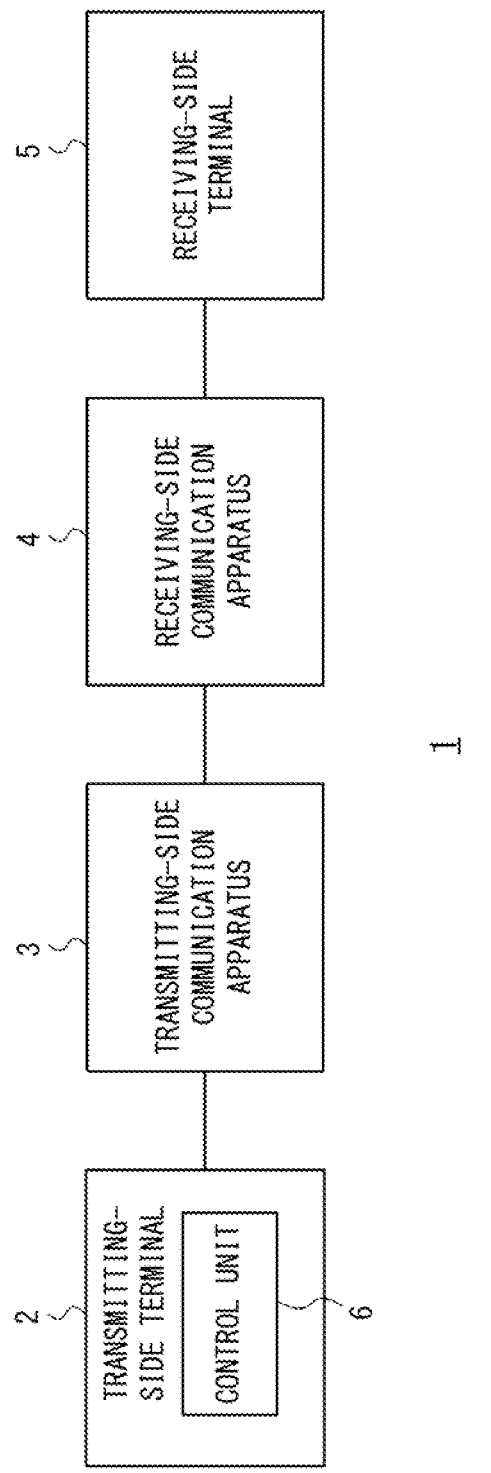
FIG. 1 is a block diagram showing an example of a configuration of a communication system according to an outline of an example embodiment.

An outline of example embodiments will be described prior to the detailed description thereof. FIG. 1 is a block diagram showing an example of a configuration of a communication system 1 according to an outline of an example embodiment. As shown in FIG. 1, the communication system 1 includes a transmitting-side terminal 2, a transmitting-side communication apparatus 3, a receiving-side communication apparatus 4, and a receiving-side terminal 5. In the communication system 1, the transmitting-side terminal 2 transmits data to the receiving-side terminal 5 through the transmitting-side communication apparatus 3 and the receiving-side communication apparatus 4.

The transmitting-side communication apparatus 3 and the receiving-side communication apparatus 4 are apparatuses that perform radio communication with each other. That is, the transmitting-side communication apparatus 3 and the receiving-side communication apparatus 4 are communicably connected with each other so that they can perform radio communication with each other. Note that the transmitting-side terminal 2 and the transmitting-side communication apparatus 3 are communicably connected with each other so that they can perform wired or radio communication with each other. In the similar manner, the receiving-side terminal 5 and the receiving-side communication apparatus 4 are communicably connected with each other so that they can perform wired or radio communication with each other.

The transmitting-side communication apparatus 3 receives data transmitted by the transmitting-side terminal 2 and transmits the received data to the receiving-side communication apparatus 4 by radio transmission. The receiving-side communication apparatus 4 transmits the data received by radio transmission from the transmitting-side communication apparatus 3 to the receiving-side terminal 5.

The transmitting-side terminal 2 includes at least a control unit 6. The control unit 6 controls the transmission speed of the data addressed to the receiving-side terminal 5 based on a first error rate that is an error rate of radio transmission from the transmitting-side communication apparatus 3 to the receiving-side communication apparatus 4 and a second error rate that is an error rate of transmission from the transmitting-side terminal 2 to the receiving-side terminal 5.

Here, the less the transmission error in the transmission from the transmitting-side terminal 2 to the transmitting-side communication apparatus 3, the smaller the difference between the first error rate and the second error rate becomes. When there are a plurality of the transmitting-side terminals 2, congestions occur in the data transmission from the transmitting-side terminals 2 to the transmitting-side communication apparatus 3 causing an error in the data transmission from the transmitting-side terminals 2 to the transmitting-side communication apparatus 3. Therefore, by referring to the first error rate and the second error rate, the transmitting-side terminal 2 can determine the suitable transmission speed at which communication can be performed while suppressing congestions. That is, in the communication system 1, since the transmitting-side terminal 2 has such a configuration to control the transmission speed based on the first error rate and the second error rate, a suitable transmission speed at which communication can be performed while suppressing congestions can be determined. Therefore, according to the communication system 1, the transmission speed at which the terminal transmits data to the communication apparatus that performs radio communication can be set suitably while suppressing congestions.

Next, the example embodiments will be described in detail.

Figure 2:
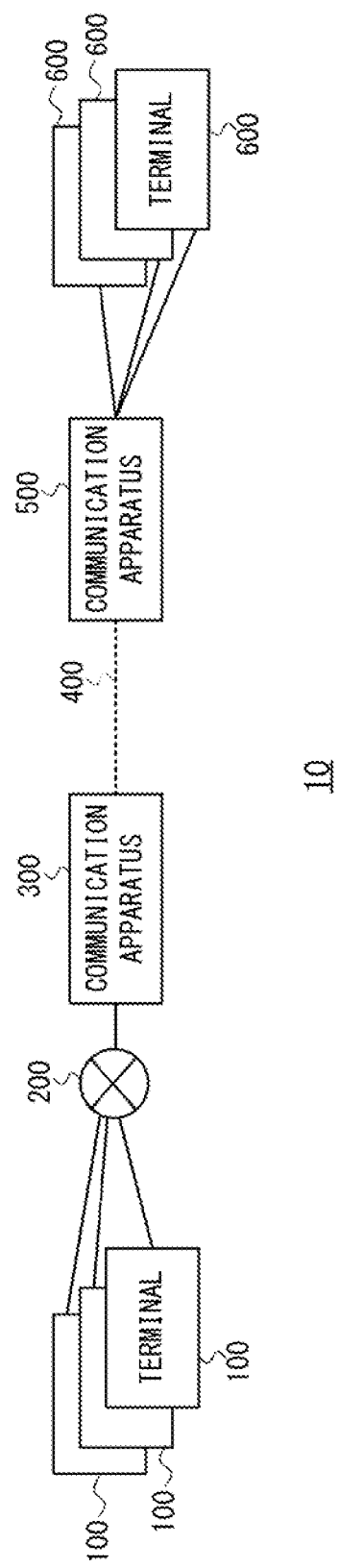
FIG. 2 is a block diagram showing an example of a configuration of a communication system according to an example embodiment.

FIG. 2 is a block diagram showing an example of a configuration of a communication system 10 according to an example embodiment. As shown in FIG. 2, the communication system 10 includes a terminal 100, a network 200, a communication apparatus 300, a radio communication line 400, a communication apparatus 500, and a terminal 600. Here, the terminal 100 corresponds to the transmitting-side terminal 2 shown in FIG. 1. The communication apparatus 300 corresponds to the transmitting-side communication apparatus 3 shown in FIG. 1. The communication apparatus 500 corresponds to the receiving-side communication apparatus 4 shown in FIG. 1. The terminal 600 corresponds to the receiving-side terminal 5 shown in FIG. 1.

The network 200 is a network communicably connected with the terminal 100 and the communication apparatus 300, for instance, a wired network, but it may instead be a radio network. The network 200 is a network that is present between the terminal 100 and the communication apparatus 300 and is a network for relaying communication between the terminal 100 and the communication apparatus 300. That is, the terminal 100 and the communication apparatus 300 are communicably connected with the network 200.

The radio communication line 400 is any radio communication line, and to be more specific, a radio communication line using, for instance, radio waves having a wavelength equal to or smaller than 1 millimeter (e.g. FSOC (Free Space Optical Communications) or the like). The radio communication line 400 is a communication line between the communication apparatus 300 and the communication apparatus 500, and the communication apparatus 300 and the communication apparatus 500 perform radio communication with each other using the radio communication line 400. Specifically, the communication apparatus 300 and the communication apparatus 500 perform radio communication with each other by a predetermined radio communication method in accordance with the adaptive modulation.

In the communication system 10, a plurality of the terminals 100 perform communication with the respective terminals 600 through the radio communication line 400 via the communication apparatus 300 and the communication apparatus 500. In this example embodiment, the terminal 100 is a terminal on the transmitting side and the terminal 600 is a terminal on the receiving side. The communication apparatus 500 and the terminal 600 are communicably connected with each other. Note that another network for relaying communication may be present between the communication apparatus 500 and the terminal 600.

The terminal 100 is a terminal on the data transmitting side, and in the terminal 100, the data to be transmitted is generated at irregular intervals. The data transmitted by performing transmission control in the terminal 100 to be described later reaches the communication apparatus 300 through the network 200 where there is a confluence of traffic of a plurality of the terminals 100. When the network 200 is congested due to the traffic volume exceeding the line speed of the communication line to the communication apparatus 300, a part of the traffic is lost in the network 200. It can be said that the traffic volume that can be input from the network 200 to the communication apparatus 300 is equal to the throughput of radio transmission by the radio apparatus 300, and among the traffic that exceeds this traffic volume, the traffic exceeding the buffer amount by a certain amount and causing the congestion is discarded.

The communication apparatus 300 performs adaptive modulation so as to attain the desired error rate or the effective communication speed in accordance with the state of the radio communication line 400. That is, the communication apparatus 300 performs radio communication with the communication apparatus 500 on the receiving side in accordance with the adaptive modulation. By this configuration, the maximum communication speed varies. A signal transmitted by the communication apparatus 300 is partially lost due to noise and the like and reaches the communication apparatus 500. The traffic received by the communication apparatus 500 is transferred to the terminal 600 which is the destination of the traffic.

That is, in the communication method according to the present example embodiment, the following state is assumed. There is an error in a part of the transmission in the radio communication line 400 and the maximum communication speed varies in accordance with the processing (the adaptive modulation) of the communication apparatus. Further, since applications of the terminal 100 on the transmitting side perform any communication, the total transmission speed of the plurality of the terminals 100 is unknown. Further, packet loss may occur due to the congestion in the network 200 on the transmitting side. In such a state, each terminal 100 on the transmitting side controls the transmission speed of the data transmitted therefrom by the method described below.

Figure 3:
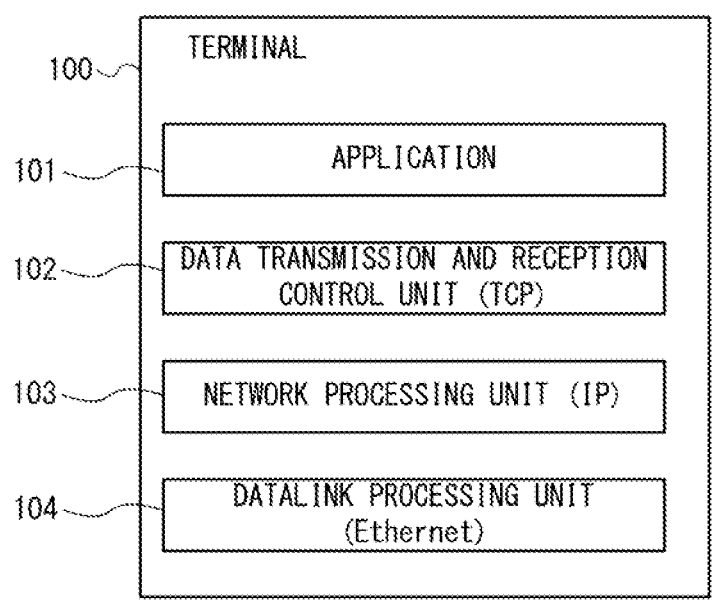
FIG. 3 is a block diagram showing an example of a configuration of a terminal on the transmitting side.

FIG. 3 is a block diagram showing an example of the configuration of the terminal 100. As shown in FIG. 3, the terminal 100 includes an application 101, a data transmission and reception control unit 102, a network processing unit 103, and a data link processing unit 104. The application 101 is an application program that generates any data to be transmitted and acquires the data received by the terminal 100. The data transmission and reception control unit 102 performs transmission and reception processing of the TCP layer. In particular, the data transmission and reception control unit 102 performs data segmentation and adjustment of the transmission volume (the transmission speed) when transmitting data. The data transmission and reception control unit 102 passes the segment to be transmitted to the network processing unit 103. The network processing unit 103 performs transmission and reception processing of the IP (Internet Protocol) layer. The network processing unit 103 packetizes the data segments from the data transmission and reception control unit 102 when transmitting data, and passes the packet to the data link processing unit 104. Further, when receiving data, the packet from the data link processing unit 104 is segmented and passed to the data transmission and reception control unit 102. The data link processing unit 104 performs transmission and reception processing of the Ethernet (registered trademark) layer. The data link processing unit 104 frames the packet received from the network processing unit 103 when transmitting data and transmits the framed packet. Further, the data link processing unit 104 packetizes the frame received from an external apparatus when receiving data, and passes the packetized frame to the network processing unit 103.

In the terminal 100 according to the present example embodiment, the data transmission and reception control unit 102 sets the transmission volume (the transmission speed) of data from the terminal 100. The data transmission and reception control unit 102 stores a target error rate. The target error rate corresponds to an error rate of communication from the communication apparatus 300 to the communication apparatus 500 in the radio communication line 400. Then, the terminal 100 determines the data transmission speed so that the error rate of communication from the terminal 100 to the terminal 600 approaches this target error rate. Here, errors in the communication from the terminal 100 to the terminal 600 include an error that occurs due to the congestion in the network 200 and an error in communication from the communication apparatus 300 to the communication apparatus 500 on the radio communication line 400. Therefore, it can be said that control of the transmission speed of the terminal 100 is controlling the transmission speed so as to reduce the former error. That is, the terminal 100 reduces the transmission speed when it is determined that the error rate due to the congestions is high and increases the transmission speed when it is determined that the error rate falls within the target range.

Specifically, the data transmission and reception control unit 102 controls the transmission speed (the transmission volume) by controlling the size of the transmission window by referring to the target error rate and the error rate of communication from the terminal 100 to the terminal 600. The method of determining the size of the transmission window in the present example embodiment will be described later.

Note that in the present example embodiment, the terminal 100 can calculate the error rate of communication from the terminal 100 to the terminal 600 based on the acknowledgement of TCP from the terminal 600 with which the terminal 100 communicates. Further, in the example embodiment, the error rate of communication from the communication apparatus 300 to the communication apparatus 500 in the radio communication line 400 is obtained by the measurement performed by the communication apparatus 500 on the receiving side and notified to the terminal 100 on the receiving side. To be more specific, in the present example embodiment, the communication apparatus 300 on the transmitting side notifies the terminal 100 on the transmitting side of the error rate in the radio communication line 400 measured by the communication apparatus 500 on the receiving side. Then, the terminal 100 controls the transmission speed by referring to the notified error rate.

Figure 4:
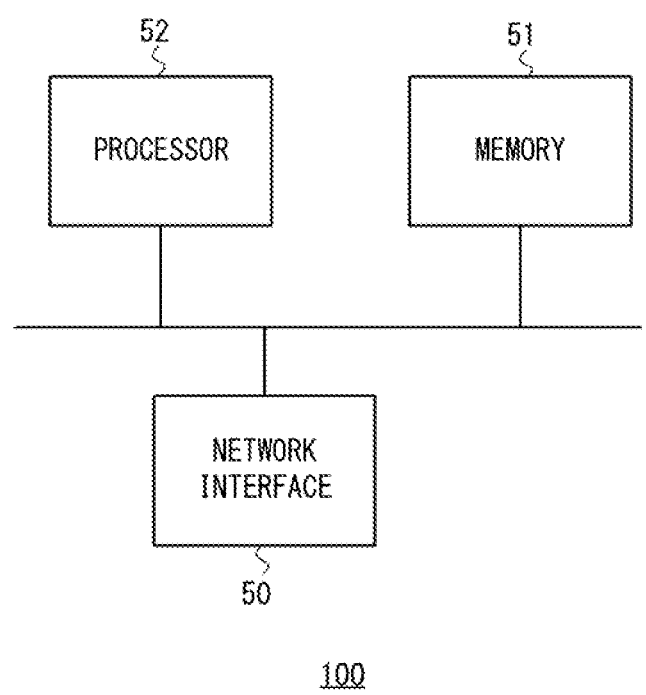
FIG. 4 is a block diagram showing an example of a hardware configuration of a terminal on the transmitting side.

Next, an example of a hardware configuration of the terminal 100 will be described. FIG. 4 is a block diagram showing an example of a hardware configuration of the terminal 100. As shown in FIG. 4, the terminal 100 includes, for instance, a network interface 50, a memory 51, and a processor 52.

The network interface 50 is used to perform communication with an external apparatus. The network interface 50 may include, for instance, a network interface card (NIC).

The memory 51 is configured of, for instance, a combination of a volatile memory and a non-volatile memory. The memory 51 is used to store software (a computer program) including one or more instructions executed by the processor 52 and data used in various processing performed by the terminal 100. The aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, and semiconductor memories (such as mask ROM, programmable ROM (PROM), Erasable PROM (EPROM), flash ROM, Random Access Memory (RAM), etc.). Further, the program may be provided to a computer using any type of transitory computer readable media. Examples of transitory computer readable media include electric signals, optical signals, and electromagnetic waves. Transitory computer readable media can provide the program to a computer through a wired communication channel such as electric wires and optical fibers or a wireless communication channel.

The processor 52 performs the processing of the terminal 100 by reading out a software (a computer program) from the memory 51 and executing the software. That is, the processing of the terminal 100 may be implemented by executing the program. Thus, the terminal 100 may include a function as a computer. The processor 52 may be, for instance, a microprocessor, a MPU (Micro Processor Unit), a CPU (Central Processing Unit), or the like. The processor 52 may include a plurality of processors.

Note that each of the communication apparatuses 300 and 500 and the terminal 600 also has the hardware configuration shown in FIG. 4 and functions as a computer. Therefore, regarding the processing of the communication apparatuses 300 and 500 and the processing of the terminal 600, each processing may also be implemented by causing the processor to execute a computer program.

Figure 5:
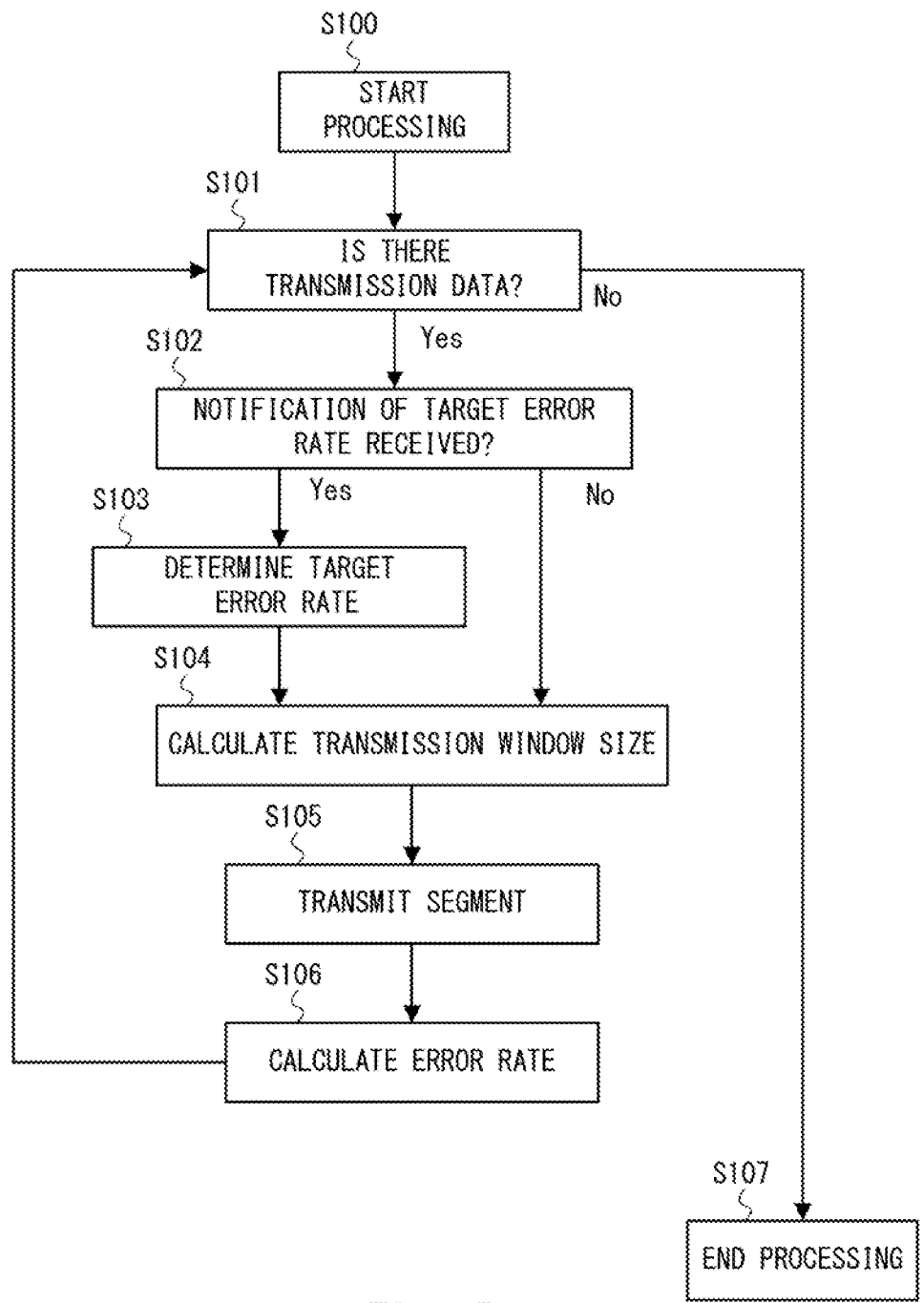
FIG. 5 is a flow chart showing an example of operations of a terminal on the transmitting side.

Hereinbelow, operations of each structural elements in the communication system 10 will be described. FIG. 5 is a flow chart showing an example of operations of the terminal 100. Hereinbelow, the flow of operations of the terminal 100 will be described with reference to the flowchart shown in FIG. 5.

Step S100:

The processing of the terminal 100 according to the present example embodiment is started by the application 101 passing the data to be transmitted to the data transmission and reception control unit 102. The data transmission and reception control unit 102 establishes a connection with the terminal 600 with which the terminal 100 communicates.

Step S101:

When there is data to be transmitted, the processing proceeds to Step S102. When there is no data to be transmitted, the processing proceeds to Step S107.

Step S102:

When the data transmission and reception control unit 102 has already received notification of the target error rate from the communication apparatus 300, the processing proceeds to Step S103. When the data transmission and reception control unit 102 has not received the target error rate, the processing proceeds to Step S104. Note than the target error rate is, for instance, notified from the communication apparatus 300 to the terminal 100 on a periodic basis and the data transmission and reception control unit 102 that has received the target error rate stores the received target error rate in the memory 51. Note that the target error rate to be notified is the error rate of communication from the communication apparatus 300 to the communication apparatus 500 in the radio communication line 400.

Step S103:

The data transmission and reception control unit 102 refers to the latest target error rate that is stored and determines the value of the target error rate used to set the transmission speed (the transmission window size). The target error rate used to set the transmission speed may be the notified value or may be an adjusted value. For instance, a target error rate adjusted so as to increase the error rate may be used. This means that congestions are somewhat allowed.

Step S104:

The data transmission and reception control unit 102 calculates the transmission window size based on the target error rate determined in Step S103 and the error rate of communication from the terminal 100 to the terminal 600. However, when notification of the target error rate has not been received (when the processing moves on to Step S104 without going through Step S103), the transmission window size is calculated based on a predetermined error rate (e.g. 0) and the error rate of communication from the terminal 100 to the terminal 600. When the error rate of communication from the terminal 100 to the terminal 600 has not been obtained, a predetermined error rate (e.g. 0) is used instead. Note that when notification of the target error rate has not been received or the error rate of communication from the terminal 100 to the terminal 600 has not been obtained, the data transmission and reception control unit 102 may set the transmission window side to a predetermined size.

Step S105:

When the transmission window size is determined in Step S104, the data transmission and reception control unit 102 performs transmission processing of the data segment in accordance with the determined window size. That is, the data transmission and reception control unit 102 transmits the amount of data segments that fit into the set transmission window size. Note that as described later, the transmission window side that has been temporarily set is fixed until a predetermined period lapses.

Step S106:

The terminal 600 that has received the segment transmitted in Step S105 transmits an acknowledgement indicating that the segment has been received to the terminal 100 on the transmitting side. In Step S106, the data transmission and reception control unit 102 of the terminal 100 on the transmitting side determines as to whether there is segment loss during communication by checking whether there is an acknowledgement for the transmitted segment. By this configuration, the data transmission and reception control unit 102 calculates the error rate of communication from the terminal 100 to the terminal 600. That is, the data transmission and reception control unit 102 calculates the error rate from the number of successful transmissions and the number of failed transmissions. The data transmission and reception control unit 102 stores the calculated error rate in the memory 51 in order to set the transmission window size. The processing of Step S101 to Step S106 as described above is repeated.

Step S107:

When there is no data to be transmitted, the processing proceeds to Step S107, and in Step S107, the data transmission and reception control unit 102 cuts off the connection to end the processing.

Figure 6:
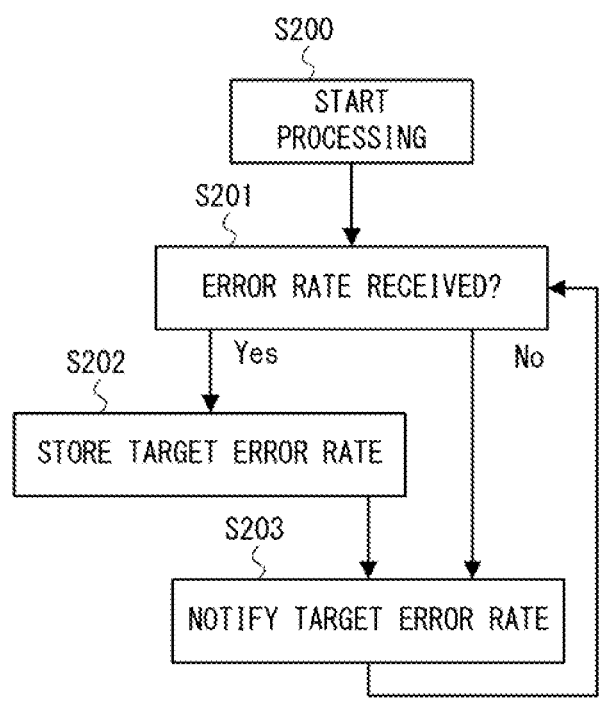
FIG. 6 is a flowchart showing an example of operations of a communication apparatus on the transmitting side.

FIG. 6 is a flowchart showing an example of operations of the communication apparatus 300 on the transmitting side. Hereinbelow, the flow of operations of the communication apparatus 300 will be described with reference to the flowchart shown in FIG. 6.

Step S200:

Processing of the communication apparatus 300 according to the present example embodiment is started by turning on the power of the communication apparatus 300. When the processing is started, the communication apparatus 300 performs transfer of the communication packets (frames). The communication apparatus 300 performs transfer by, for instance, embedding, in the frames, numbers that are regularly set in accordance with the order of transmission. Further, the communication apparatus 300 waits for reception of the notification of the error rate from the communication apparatus 500 on the receiving side.

Step S201:

If the communication apparatus 300 has received the error rate from the communication apparatus 500, the processing proceeds to Step S202. When the error rate has not been received, the processing proceeds to Step S203.

Step S202:

The communication apparatus 300 stores the error rate received from the communication apparatus 500 as a target error rate to be notified to the terminal.

Step S203:

The communication apparatus 300 notifies the terminal 100 on the transmitting side of the latest target error rate stored in Step S202. Note that when a new error rate is not received from the communication apparatus 500 (when the processing proceeds to Step S203 without going through Step S202), the communication apparatus 300 notifies the terminal 100 of the same error rate as that previously notified. The processing as described above from Step S201 through to Step S203 is repeated.

Figure 7:
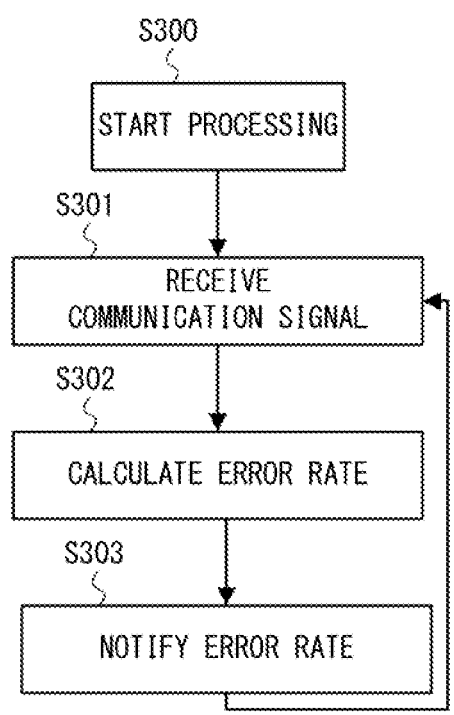
FIG. 7 is a flowchart showing an example of operations of a communication apparatus on the receiving side.

FIG. 7 is a flowchart showing an example of operations of the communication apparatus 500 on the receiving side. Hereinbelow, the flow of operations of the communication apparatus 500 will be described with reference to the flowchart shown in FIG. 7.

Step S300:

Processing of the communication apparatus 500 according to the present example embodiment is started by turning on the power of the communication apparatus 500. When the processing is started, the communication apparatus 500 performs transfer of the communication packets (frames).

Step S301:

The communication apparatus 500 receives a communication signal from the communication apparatus 300.

Step S302:

The communication apparatus 500 calculates the error rate of the communication signal. That is, the communication apparatus 500 calculates the error rate of communication from the communication apparatus 300 to the communication apparatus 500 in the radio communication line 400. Specifically, for instance, the communication apparatus 500 detects occurrence of the transmission error by confirming the numbers that are regularly set in the frames transmitted from the communication apparatus 300. That is, when a frame with a certain number is not received, the communication apparatus 500 grasps that an error has occurred in the transfer of the frame with the certain number. The communication apparatus 500 calculates the error rate from the number of times of successful and unsuccessful transmissions from the communication apparatus 300 to the communication apparatus 500.

Step S303:

The communication apparatus 500 notifies the communication apparatus 300 on the transmitting side of the error rate measured in Step S302. The error rate thus notified is received by the communication apparatus 300 in Step S201 shown in FIG. 6 as described above. The processing from Step S301 through to Step S303 as described above is repeated. Thus, the notification of the error rate is performed on a periodical basis. Note that as described above, in the present example embodiment, the error rate in the radio communication line 400 is measured and notified. Therefore, it is expected that more accurate control can be performed compared to the case in which, for instance, the reference value of the error rate (i.e. the error rate referred to for carrying out adaptive modulation) preset in the communication apparatus 300 or the communication apparatus 500 in order to ensure desired line quality by carrying out the adaptive modulation is notified.

Figure 8:
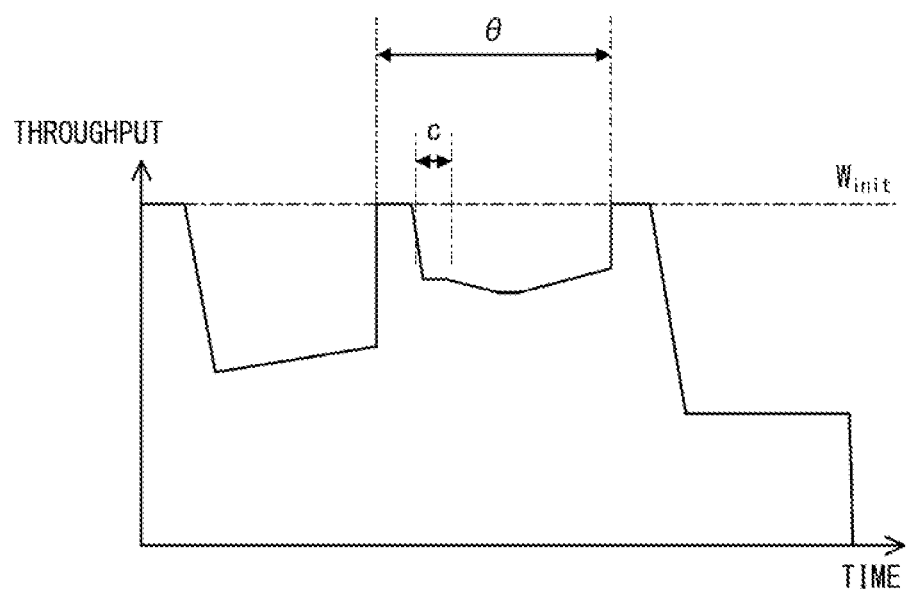
FIG. 8 is a graph showing an example of transitions in the throughput based on a transmission window set by a data transmission and reception control unit.

Next, calculation of the transmission window size (i.e. the transmission speed) by the data transmission and reception control unit 102 of the terminal 100 according to the present example embodiment will be described. The data transmission and reception control unit 102 adjust the window size so that the difference between the error rate of communication from the terminal 100 to the terminal 600 and the target error rate is small. In other words, the data transmission and reception control unit 102 adjusts the window size so as to reduce the error due to the congestion in the network 200. A specific example of control of the transmission window according to the present example embodiment is shown in FIG. 8. FIG. 8 is a graph showing an example of transitions in the throughput based on a transmission window set by the data transmission and reception control unit 102.

The data transmission and reception control unit 102 performs setting so as to express the initial value $w_{init}$ of the transmission window size in Expression (1).

[Expression 1]

$$w_{init} = \alpha \times S \times D \quad (1)$$

Here, S denotes the predetermined communication bandwidth that is assumed in advance. As the value for S, for instance, 10 Gbit/s is applied. D denotes the predetermined round trip time (RTT: Round Trip Time) of data transmission between the terminal 100 and the terminal 600 that is assumed in advance. For instance, as the value for D, 240 ms is applied. α is a coefficient for adjusting a so-called bandwidth-delay product. That is, α is a coefficient for specifying the margin set with respect to the product of S and D. When the initial value $w_{init}$ in which α is equal to or larger than 1 is set as the transmission window size, assuming that there is a buffer in the network 200, the terminal 100 transmits the data volume exceeding the bandwidth-delay product. For instance, as the value for α, 2 is applied.

Further, the data transmission and reception control unit 102 performs control of the transmission window size as expressed by the following Expression (2) every time the control cycle period $c_i$ elapses. Here, i denotes an integer equal to or greater than 1, more specifically, $c_1$ represents the period during which $w_{init}$ is applied to the transmission window size. Further, the data transmission and reception control unit 102 initializes the transmission window size for every predetermined initialization time interval θ. That is, the data transmission and reception control unit 102 resets the transmission window size to the initial value $w_{init}$ for every predetermined initialization time interval θ.

[Expression 2]

$$w_{i+1} = \max\left(w_{init} \times u(t), w_i \times \min\left(\frac{1-\beta \times p_i}{1-P}, \gamma\right)\right) \quad (2)$$

Note that $w_i$ is the transmission window size used in the i-th period of the control cycle period $c_i$. Therefore, $w_{i+1}$ represents the new transmission window size used in period after the i-th period of the control cycle period $c_i$. P is the target error rate. Note that P may be, for instance, a predetermined value such as 0.01. $p_i$ denotes the error rate of communication from the terminal 100 to the terminal 600 measured in the i-th period of control cycle period $c_i$. Note the fraction indicated on the right side of Expression (2) represents comparison of the error rates. Since the error rates are subtracted from 1 in the denominator and the numerator of this fraction, it can be said that the fraction represents comparison of communication success rates. β is a coefficient for adjusting the measured error rate of communication from the terminal 100 to the terminal 600. For instance, the value of β is 1, but other value may be applied in order to perform the adjustment. γ is a parameter for adjusting the acceleration speed of the transmission window size. For instance, the value of γ is 1.1.

Here, the error rate is adjusted according to β so as to reduce the error rate. In this case, the window size is set allowing some congestions. With this configuration, since traffic of certain extent can be accumulated in the buffer of the network 200, it is possible to suppress reduction in the throughput due to lack of traffic. Note as mentioned in the description of Step S103, the target error rate may be adjusted. That is, the target error rate adjusted so as to increase the error rate may be used. In this case too, the same effect can be expected. As described above, the data transmission and reception control unit 102 may control the transmission speed based on the error rate adjusted so as to reduce the error rate of communication from the terminal 100 to the terminal 600. Further, the data transmission and reception control unit 102 may control the transmission speed based on the error rate adjusted so as to increase the target error rate.

Further, in Expression (2), u(t) is a function expressed by the following Expression (3). Note that θ is a parameter for adjusting the initialization interval of the transmission window size. For instance, 5 seconds is applied as a value for θ.

[Expression 3]

$$u(t) = \begin{cases} 1: & \text{when initialization time interval } \theta \text{ elapses} \\ 0: & \text{other cases} \end{cases} \quad (3)$$

Further, in the present example embodiment, the control cycle period $c_i$ is expressed by the following Expression (4).

[Expression 4]

$$c_i = \mu \times d_{i-1} \quad (4)$$

Here, $d_i$ is a round trip time of data transmission between the terminal 100 and the terminal 600 measured in the i-th period of the control cycle period $c_i$. Note that as the value of $d_{i-1}$ (that is, the value of $d_0$) when i=1, for instance, a predetermined value is used. Further, µ is a parameter for adjusting the updating interval of the transmission window size. For instance, as a value for µ, 2 is used.

As indicated in Expression (4), the data transmission and reception control unit 102 controls the transmission speed (the transmission window size) of data addressed to the terminal 600 in a control cycle set in accordance with the round trip time of data transmission from the terminal 100 to the terminal 600. As described above, in the present example embodiment, the error rate of communication from the terminal 100 to the terminal 600 is calculated based on an acknowledgement from the terminal 600. Therefore, when the control cycle period $c_i$ shorter than the round trip time is set, the window size is updated (that is, the calculation processing expressed by the Expression (2) is performed) before a new error rate is calculated, causing unnecessary calculation of error rates. On the other hand, by defining the control cycle period $c_i$ as shown in the Expression (4), the control cycle period $c_i$ longer than the round trip time can be set, whereby it is possible to suppress unnecessary processing.

As understood from the Expression (2), the data transmission and reception control unit 102 performs control so as to reduce the transmission speed (the transmission window size) compared to the currently set value when, for instance, the error rate of communication from the terminal 100 to the terminal 600 is higher than the target error rate. Accordingly, congestions can be suppressed. Further, the data transmission and reception control unit 102 performs control so as to increase the transmission speed (the transmission window size) compared to the currently set value, when, for instance, the error rate of the communication from the terminal 100 to the terminal 600 is lower than the target error rate. Accordingly, it is possible to maximize the transmission speed while suppressing congestions. As described above, according to the present example embodiment, the terminal 100 can determine an appropriate transmission speed at which communication can be performed while suppressing congestions.

Note that the present disclosure is not limited to the example embodiments described above and can be changed as appropriate without departing from the spirit of the present disclosure.

The whole or part of the example embodiments disclosed above can be described as, but not limited to, the following supplementary notes.

(Supplementary Note 1)
A communication system comprising:
a transmitting-side terminal;
a transmitting-side communication apparatus configured to receive data transmitted by the transmitting-side terminal and transmit the received data by radio transmission to a receiving-side communication apparatus; and
the receiving-side communication apparatus configured to transmit the data received by radio transmission from the transmitting-side communication apparatus to a receiving-side terminal,
the transmitting-side terminal including control means for controlling a transmission speed of the data addressed to the receiving-side terminal based on a first error rate that is an error rate of radio transmission from the transmitting-side communication apparatus to the receiving-side communication apparatus and a second error rate that is an error rate of transmission from the transmitting-side terminal to the receiving-side terminal.

(Supplementary Note 2)
The communication system described in Supplementary note 1, wherein the control means performs control so as to reduce the transmission speed to be lower compared to the currently set value when the second error rate is higher than the first error rate.

(Supplementary Note 3)
The communication system described in Supplementary note 1 or 2, wherein the control means performs control so as to increase the transmission speed to be higher compared to the currently set value when the second error rate is lower than the first error rate.

(Supplementary Note 4)
The communication system described in any one of Supplementary notes 1 to 3, wherein the control means performs control of the transmission speed of the data addressed to the receiving-side terminal based on an error rate adjusted to be lower than the second error rate and the first error rate.

(Supplementary Note 5)
The communication system described in any one of Supplementary notes 1 to 4, wherein the control means performs control of the transmission speed of the data addressed to the receiving-side terminal based on an error rate adjusted to be greater than the first error rate and the second error rate.

(Supplementary Note 6)
The communication system described in any one of Supplementary notes 1 to 5, wherein
the transmitting-side communication apparatus notifies the transmitting-side terminal of the first error rate measured by the receiving-side communication apparatus, and
the control means controls the transmission speed using the first error rate that has been notified by the transmitting-side communication apparatus.

(Supplementary Note 7)
The communication system described in any one of Supplementary notes 1 to 6, wherein the control means performs control of the transmission speed of data addressed to the receiving-side terminal in a control cycle set in accordance with a round trip time of data transmission from the transmitting-side terminal to the receiving-side terminal.

(Supplementary Note 8)
The communication system described in any one of Supplementary notes 1 to 7, wherein the transmitting-side communication apparatus performs radio communication with the receiving-side communication apparatus in accordance with adaptive modulation.

(Supplementary Note 9)
A terminal configured to transmit, to a transmitting-side communication apparatus configured to perform radio communication with a receiving-side communication apparatus configured to perform communication with a receiving-side terminal, data addressed to the receiving-side terminal, the terminal comprising
control means for controlling a transmission speed of the data addressed to the receiving-side terminal based on a first error rate that is an error rate of radio transmission from the transmitting-side communication apparatus to the receiving-side communication apparatus and a second error rate that is an error rate of transmission from the terminal to the receiving-side terminal.

(Supplementary Note 10)

The terminal described in Supplementary note 9, wherein the control means performs control so as to reduce a transmission speed to be lower compared to the currently set value when the second error rate is higher than the first error rate.

(Supplementary Note 11)

A method of controlling a terminal configured to transmit, to a transmitting-side communication apparatus configured to perform radio communication with a receiving-side communication apparatus configured to perform communication with a receiving-side terminal, data addressed to the receiving-side terminal, the method comprising:

acquiring a first error rate that is an error rate of radio transmission from the transmitting-side communication apparatus to the receiving-side communication apparatus and a second error rate that is an error rate of transmission from the terminal to the receiving-side terminal; and controlling a transmission speed of the data addressed to the receiving-side terminal based on the first error rate and the second error rate.

(Supplementary Note 12)

A non-transitory computer readable medium storing a program for causing a computer of a terminal configured to transmit, to a transmitting-side communication apparatus configured to perform radio communication with a receiving-side communication apparatus configured to perform communication with a receiving-side terminal, data addressed to the receiving-side terminal to perform a control step of controlling a transmission speed of the data addressed to the receiving-side terminal based on a first error rate that is an error rate of radio transmission from the transmitting-side communication apparatus to the receiving-side communication apparatus and a second error rate that is an error rate of transmission from the terminal to the receiving-side terminal.

As described above, the present disclosure has been made with reference to the example embodiments, however the present disclosure is not to be limited to the above. Various changes can be made to the configuration and the details of the present disclosure within the scope of the disclosure that can be understood by one skilled in the art.

This application is based upon and claims the benefit of priority from Japanese patent application No. 2019-107112, filed on Jun. 7, 2019, the entire contents of which are incorporated herein by reference.

REFERENCE SIGNS LIST

1 COMMUNICATION SYSTEM
2 TRANSMITTING-SIDE TERMINAL
3 TRANSMITTING-SIDE COMMUNICATION APPARATUS
4 RECEIVING-SIDE COMMUNICATION APPARATUS
5 RECEIVING-SIDE TERMINAL
6 CONTROL UNIT
10 COMMUNICATION SYSTEM
50 NETWORK INTERFACE
51 MEMORY
52 PROCESSOR
100 TERMINAL
101 APPLICATION
102 DATA TRANSMISSION AND RECEPTION CONTROL UNIT
103 NETWORK PROCESSING UNIT
104 DATALINK PROCESSING UNIT
200 NETWORK
300 COMMUNICATION APPARATUS
400 RADIO COMMUNICATION LINE
500 COMMUNICATION APPARATUS
600 TERMINAL

What is claimed is:

1. A communication system comprising:
a transmitting-side terminal;
a transmitting-side communication apparatus configured to receive data transmitted by the transmitting-side terminal and transmit the received data by radio transmission to a receiving-side communication apparatus; and
the receiving-side communication apparatus configured to transmit the data received by radio transmission from the transmitting-side communication apparatus to a receiving-side terminal,
the transmitting-side terminal comprising:
at least one memory storing instructions; and
at least one processor configured to execute the instructions stored in the memory to control a transmission speed of the data addressed to the receiving-side terminal based on a first error rate that is an error rate of radio transmission from the transmitting-side communication apparatus to the receiving-side communication apparatus and a second error rate that is an error rate of transmission from the transmitting-side terminal to the receiving-side terminal,
wherein the processor is further configured to execute the instructions to perform control so as to reduce the transmission speed to be lower compared to a currently set value when the second error rate is higher than the first error rate.

2. The communication system according to claim 1, wherein the processor is further configured to execute the instructions to perform control so as to increase the transmission speed to be higher compared to the currently set value when the second error rate is lower than the first error rate.

3. The communication system according to claim 1, wherein the processor is further configured to execute the instructions to perform control of the transmission speed of the data addressed to the receiving-side terminal based on an error rate adjusted to be lower than the second error rate and the first error rate.

4. The communication system according to claim 1, wherein the processor is further configured to execute the instructions to perform control of the transmission speed of the data addressed to the receiving-side terminal based on an error rate adjusted to be greater than the first error rate and the second error rate.

5. The communication system according to claim 1, wherein
the transmitting-side communication apparatus notifies the transmitting-side terminal of the first error rate measured by the receiving-side communication apparatus, and
the processor is further configured to execute the instructions to control the transmission speed using the first error rate that has been notified by the transmitting-side communication apparatus.

6. The communication system according to claim 1, wherein the processor is further configured to execute the instructions to perform control of the transmission speed of data addressed to the receiving-side terminal in a control cycle set in accordance with a round trip time of data transmission from the transmitting-side terminal to the receiving-side terminal.

7. The communication system according to claim 1, wherein the transmitting-side communication apparatus performs radio communication with the receiving-side communication apparatus in accordance with adaptive modulation.

8. A method of controlling a terminal configured to transmit, to a transmitting-side communication apparatus configured to perform radio communication with a receiving-side communication apparatus configured to perform communication with a receiving-side terminal, data addressed to the receiving-side terminal, the method comprising:

acquiring a first error rate that is an error rate of radio transmission from the transmitting-side communication apparatus to the receiving-side communication apparatus and a second error rate that is an error rate of transmission from the terminal to the receiving-side terminal; and controlling a transmission speed of the data addressed to the receiving-side terminal based on the first error rate and the second error rate, wherein the controlling the transmission speed comprises performing control so as to reduce the transmission speed to be lower compared to a currently set value when the second error rate is higher than the first error rate.

9. A non-transitory computer readable medium storing a program for causing a computer of a terminal configured to transmit, to a transmitting-side communication apparatus configured to perform radio communication with a receiving-side communication apparatus configured to perform communication with a receiving-side terminal, data addressed to the receiving-side terminal to perform a control step of controlling a transmission speed of the data addressed to the receiving-side terminal based on a first error rate that is an error rate of radio transmission from the transmitting-side communication apparatus to the receiving-side communication apparatus and a second error rate that is an error rate of transmission from the terminal to the receiving-side terminal, wherein the control step comprises performing control so as to reduce the transmission speed to be lower compared to a currently set value when the second error rate is higher than the first error rate.

* * * * *